United States Patent [19]

Tsao et al.

[11] Patent Number: 5,742,443
[45] Date of Patent: Apr. 21, 1998

[54] METHOD AND APPARATUS FOR DATA PLACEMENT OF CONTINUOUS MEDIA TO UTILIZE BANDWIDTH EFFICIENCY

[75] Inventors: Shiao-Li Tsao, Taipei; Yueh-Min Huang, Nan-Tou Hsien; Eric Lee, Pan-Ch'iao; Yih-Woei Liang, Hsinchu, all of Taiwan

[73] Assignee: Industrial Technology Research Institute, Hsinchu, Taiwan

[21] Appl. No.: 657,739

[22] Filed: May 31, 1996

[51] Int. Cl.$^6$ .................................................. G11B 5/09
[52] U.S. Cl. .................. 360/50; 360/78.04; 369/44.26; 395/445
[58] Field of Search ............................. 395/445; 360/50, 360/78.04; 369/44.26

[56] References Cited

U.S. PATENT DOCUMENTS

| | | | |
|---|---|---|---|
| 4,570,189 | 2/1986 | Lode | 360/50 |
| 4,757,406 | 7/1988 | Stewart et al. | 360/51 |
| 4,799,112 | 1/1989 | Bremmer et al. | 360/31 |
| 4,858,034 | 8/1989 | Hassel et al. | 360/51 |
| 4,953,039 | 8/1990 | Ploch | 360/32 |
| 5,227,737 | 7/1993 | Sutliff et al. | 330/254 |
| 5,278,700 | 1/1994 | Sutliff et al. | 360/46 |
| 5,475,542 | 12/1995 | Bentley et al. | 360/74.1 |
| 5,602,689 | 2/1997 | Kadlec et al. | 360/78.04 |

Primary Examiner—Tod R. Swann
Assistant Examiner—James Peikari
Attorney, Agent, or Firm—W. Wayne Liauh

[57] ABSTRACT

An improved method is disclosed for placing continuous media data in a memory storage disk that will increase the disk operating efficiency and increase the number of users in a service round. The memory storage disk contains a plurality of tracks each track having at least one sector and the disk is divided into a plurality of physical zones of different sector/track density, and the method comprising the steps of: (a) dividing the disk into a plurality of logical zones of equal number of tracks, each logical zone being allowed to include tracks of different sector/track density; (b) for each logical zone, setting the tracks contained therein to have the same number of sector/density as the track with the smallest sector/track density; (c) assigning a constant disk access time for each logical zone; and (d) determining a read block size for each logical zone in such a manner that: (i) the read block size decreases from outer logical zones to inner logical zones; (ii) assigning a first portion of the logical zones with read block sizes that are greater than a minimum read block size required for continuous media playing so as to read extra data, which will be stored in a buffer; (iii) assigning a second portion of the logical zones with read block sizes that are smaller than the minimum read block size to thereby cause an inadequacy; and (iv) the block sizes are structured such that the inadequacy from the second portion of logical zones will be compensated by the extra data stored in the buffer, so as to ensure a continuous media play requirement.

16 Claims, 10 Drawing Sheets

METHOD AND APPARATUS FOR DATA PLACEMENT OF CONTINUOUS MEDIA TO UTILIZE BANDWIDTH EFFICIENCY

FIELD OF THE INVENTION

The present invention relates to an improved method for the placement of continuous media data which utilizes the characteristic disk bandwidth variations of physically zones disks so as to increase the number of users that can be served during a service cycle. More specifically, the present invention relates to an improved method of data placement for continuous media for use with physically zoned disks (i.e., disks with zones of different sectors/track) which utilizes the disk bandwidth variations associated with the different data transfer rates that exist between outer and inner zones, so as to increase the number of clients/users that can access and use the data stored on the disk during the same service round. One of the applications in which the method disclosed in the present invention can be most advantageously implemented is to provide an improved and more efficient video-on-demand (VOD) server.

BACKGROUND OF THE INVENTION

Today's hard disks typically utilize a disk zoning technology to increase the capacity thereof. With disk zoning, the disk surface is physically divided into several zones of continuous tracks, each zone has a different density of sectors per track (sectors/track). This is the so-called physically zoned disk. In a physically zoned disk, the outer zones have a greater number of sectors/tracker than the inner zones. Because the disk spins at a constant angular velocity, the outer zone will have a greater data transfer rate than the inner zone. This creates a disk bandwidth.

FIGS. 1 and 2 show the schematic top views of unzoned and zoned hard disks, respectively. The zoned disk has a greater sector/track density at its outer zone. Zoning of the hard disk increases its data storage capacity. Because the disk spins at a constant angular speed during the data I/O operations, the outer and inner zones of the same disk will exhibit significantly different disk bandwidth. Heretofore this bandwidth variation has not been utilized or even recognized by hard disk manufacturers or designers. One of the key elements of the present invention is to develop a novel data displacement method for continuous media data, which takes advantage of this bandwidth discrimination. The method disclosed in the present invention can substantially reduce the disk seeking time and increase the number of users that can be served during the same service round.

U.S. Pat. No. 5,422,760 reported that utilizing the zoning technique would result in differences in data transfer rates between the outer zones and the inner zones of the same disk. However, the '760 patent only reported this observation, and it was never taught or suggested that an advantageous feature could be derived from this difference.

Horng Juing Lee, et al. in an article entitled "Cluster Placement: A Data Placement Scheme for A Mass Storage System of a Video-on-Demand Server," *University of Minnesota Technical Report*, 1995; and Yen-Jen Oyang, Chun-Hung Wen, Chin-Yuan Cheng, Meng-Huang Lee, and Jian-Tian Li, in another article entitled "A Multimedia Storage System for Video-on-Demand Playback," IEEE Transaction on Consumer Electronics, 1995, proposed a method of partitioning the disk surface into several regions, and a user will be served only when the magnetic head is residing in the same region in which the requested data is stored. This method was able to reduce the seeking time; however, no mentioning was made about the physically distinguishable zones on the disk surface. Thus this method did not teach or suggest that the bandwidth discrimination that exists in a physically zoned disk may be utilized to improve disk efficiency.

In an article entitled "Track-Pig: A Novel Data Layout for VOD Servers with Multi-Zone-Recording Disks," Proc. Of 1995 International Conference on Multimedia Computing and System, Yitzhak Birk discussed the different data transfer rates observed in a video-on-demand server which utilizes zoned disks. They reported that this resulted in variations in the output video streams associated with the outer and inner zones of the same disk. A technique was proposed by which an outer track is paired with a corresponding inner track in a manner such that the data transfer rates would be somewhat equalized. For example, if N tracks are provided on a disk surface and the tracks are numbered from 0 (outermost) through N−1 (innermost), then track 0 will be paired with track N−1, track 1 will be pied with track N−2, and so forth. This method may reduce the unevenness in the data transfer rates of a zoned disk; however, it also greatly increases the track seeking time and thus is not a very practical approach. Furthermore, because the distribution of data transfer rates among the various tracks can be highly non-linear, such a pairing scheme may not result in the desired smoothness.

SUMMARY OF THE INVENTION

The primary object of the present invention is to develop an improved method of data placement for continuous media data for use with a physically zoned disk to utilize the bandwidth difference between outer and inner tracks so as to, among other things, increase the number of users that can be served during a service cycle. More specifically, the primary object of the present invention is to develop an improved data placement method for very large continuous media data, such as in providing of video-on-demand servers, which utilizes the difference in bandwidth that exists between the outer and inner tracks of a physical zoned hard disk so as to reduce the disk seeking time and increase the number of users that can be served during a service round.

In the method disclosed in the present invention, the disk surface is divided into several logical zones, each logical zone comprising a number of continuous tracks. In the present invention, a logical zone can cross one or more physical zones, i.e., the same logical zone can contain tracks with different sectors/track. An optimum data read block length (or size) is determined for each logical zone, and the continuous media are segmented and placed onto the various logical zones of the disk surface according to the read block length. In a preferred embodiment of the present invention, the read block length is an integer multiple of the tracks. This minimizes the rotational latency and utilizes the read-ahead feature of a hard disk. During the data displacement, the continuous media are placed into the various logical zones according to the SCAN methodology, by which the continuous data are first stored in the logical zone at the middle of the disk surface, then cycled inward, outward and again inward until it reached just before the middle logical zone. Then it moves to another disk and repeats the same data placement cycle. The SCAN method allows the data load on each disk to be evenly balanced.

In addition to the provision of logical zones, in order to utilize the bandwidth that exists in a physically zoned disk surface, the method disclosed in the present invention employs read block lengths which vary among different logical zones (i.e., decreasing from outer to inner logical zones), and a compensation strategy for inadequate data read from inner logical zones. Each read block, which constitutes the base unit of data placement, comprises an integer multiple of data tracks. The present invention assigns the same service time for each logical zone. Because the data transfer rate is greater for the outer zones, the data block size (in terms of data bits) will be greater for the outer zones than for the inner zones. This implementation reduces the time that the magnetic head will stay in the lower rate inner zones when serving users, and this allows the number of users to be increased during a service cycle. To avoid data discontinuity because of the relatively smaller and inadequate amount of data read from the inner zones, some of data read from the outer zones (i.e., the "excess" data) are buffered so as to compensate for the data inadequacy associated with reading from the inner zones. The present invention also develops a strategy for calculating the optimum read block size so as to maximize the number of users that can be served in a service round, in accordance with the response time and other hardware parameters.

The read block is the amount of data to be read by the magnetic head on a continuous basis, after the magnetic head has moved to the correct track. In the present invention, the read block is an integer multiple of magnetic tracks. A higher read block size reduces the seeking time but it also increases the demand on the memory requirement. Another element that must be considered in designing the read block size is that the amount of time to be consumed by a user (in exploiting the data that has been read) must be greater than the service time required by the magnetic head for the same user during the next data read, so as to ensure data continuity.

In the present invention, while the actual number of sectors in different tracks may vary in a physically zoned disk, all the tracks in the same logical zone are set to have the same number of sectors, and the read block size is calculated according to the following formula (based on uniform service time for all the logical zones):

Formula 1:

$$\frac{B_1}{T_1} = \frac{B_2}{T_2} = \frac{B_3}{T_3} = \ldots = \frac{B_M}{T_M}$$

wherein B is the data block size, $B_i$ is the data block size in logical zone i, $T_i$ is lowest data transfer rate in logical zone i, and M is the number of logical zones.

As an initial analysis, we assume that the read data block size is the same for all the different logical zones. Under this assumption, the read block size can be calculated according the following formula:

Formula 2:

$$\frac{B}{T_m} \cdot N + S_{mbz} + (N-1) \cdot S_{miz} + N \cdot (n-1) \cdot S_{tt} < \frac{B}{B_t}$$

wherein N is the number of users (or clients) to be served, n is the number of tracks contained in a logical zone, $T_m$ is the minimum data transfer rate in the disk, $S_{mbz}$ is the maximum seeking time required by the magnetic head between two neighboring logical zones, $S_{miz}$ is the maximum seeking time required by the magnetic head within a logical zone, $S_{tt}$ is the average seeking time between tracks (including the rotational latency required for changing head, and seeking time), $B_t$ is the (constant) bit rate of the continuous media, and B is the assumed constant read block size, which is an integer multiple of data tracks.

Formula 2 only considers a single service round. When we consider M service rounds from the first logical zone to the Mth logical zone, Formula 2 can be rewritten as follows (again, assuming constant read data block size):

Formula 3:

$$N \cdot \sum_{i=1}^{M} \frac{B}{T_m} + S_{miz} \cdot (N-1) \cdot M + M \cdot S_{mbz} + M \cdot N \cdot (n-1) \cdot S_{tt} < \frac{M \cdot B}{B_t}$$

or $$N < \frac{T_m \cdot [B - B_t \cdot (S_{mbz} - S_{miz})]}{B_t \cdot (B + T_m \cdot S_{miz} + T_m \cdot (n-1) \cdot S_{tt})}$$

Now we consider the situation of varying read block size. Formula 3 can be rewritten as follows:

Formula 4:

$$N \cdot \sum_{i=1}^{M} \frac{B_i}{T_i} + S_{miz} \cdot (N-1) \cdot M + M \cdot S_{mbz} +$$

$$M \cdot N \cdot (n-1) \cdot S_{tt} < \frac{\sum_{i=1}^{M} B_i}{B_t}$$

The read block size for each logical zone can be calculated according to Formula 4, above, after taking into consideration the number of users intended to be served, the total amount of data during the M service rounds, and the data transfer rate in each logical zone. In the method disclosed in the present invention, the time allocated for the magnetic head is the same for all the logical zones. Because the transfer rates vary in different logical zones, the read block size will also vary accordingly. Inner zones, because of their lower data transfer rates, will be assigned smaller read block sizes, respectively. The time saved in reading from inner logical zones can be used for adding new users. However, the read block size in the inner logical zones may not satisfy the continuity requirement of the read data. This is compensated by reading extra data from the outer logical zones. These extra data are stored in a buffer to be later consumed during reading operations associated with the inner logical zones. The read data block size in each logical zone is calculated according to the following formula:

Formula 5:

$$\frac{B_1}{T_1} = \frac{B_2}{T_2} = \frac{B_3}{T_3} = \ldots = \frac{B_m}{T_m}$$

In Formula 5, $B_m$ and $T_m$ are the read block size and the data transfer rate, respectively, of the logical zone with the lowest data transfer rate. From Formula 5, we can calculate the read block size for each logical zone:

Formula 6:

$$B_i = \frac{\sum_{j=1}^{M} B_j}{\sum_{j=1}^{M} T_j} \cdot T_i$$

Substituting Formula 6 into Formula 4, we can obtain:

$$N \cdot M \cdot \frac{\sum_{i=1}^{M} B_i}{\sum_{i=1}^{M} T_i} + S_{miz} \cdot (N-1) \cdot M + M \cdot S_{mbz} +$$

$$M \cdot N \cdot (n-1) \cdot S_{tt} < \frac{\sum_{i=1}^{M} B_i}{B_t}$$

$$N \cdot \left( M \cdot \frac{\sum_{i=1}^{M} B_i}{\sum_{i=1}^{M} T_i} + S_{miz} \cdot M + M \cdot (n-1) \cdot S_{tt} \right) <$$

$$\frac{\sum_{i=1}^{M} B_i}{B_t} - S_{mbz} \cdot M + S_{miz} \cdot M$$

Formula 7:

$$N < \frac{\frac{\sum_{i=1}^{M} B_i}{B_t} - M \cdot (S_{mbz} - S_{miz})}{M \cdot \left( \frac{\sum_{i=1}^{M} B_i}{\sum_{i=1}^{M} T_i} + S_{miz} + (n-1) \cdot S_{tt} \right)}$$

From Formula 7, after the maximum number of users is determined (i.e., the maximum allowable value of N), we can calculate the sum of the read blocks in all the logical zones $$\left( \text{i.e.,} \sum_{i=1}^{M} B_i \right),$$

then use Formula 6 to calculate the read block size for each logical zone.

Equation 7 can be rearranged to calculate the total amount of data read, $$\overline{B} \left( = \sum_{i=1}^{M} B_i \right),$$

during the M service rounds from the outermost zone to the innermost zone, as follows: Formula 8:

Formula 8:

$$\overline{B} > \frac{M \cdot B_i \cdot \sum_{i=1}^{M} T_i \cdot (N \cdot (n-1) \cdot S_{tt} + S_{mbz} - S_{miz})}{\sum_{i=1}^{M} T_i - N \cdot B_t}$$

The read block size for each logical zone can be calculated as follows:

$$B_i = \overline{B} \cdot \frac{T_i}{\sum_{i=1}^{M} T_i}$$

In the present invention, the same amount of service time is assigned to all the logical zones. Because the transfer rates differ from logical zone to logical zone, extra amounts of data must be read from outer logical zones and buffered so as to compensate for the inadequacy of data read from inner logical zones. To calculate the size of the buffer zone, we first calculate the minimum size of a read block, B', which can satisfy the media continuity requirement. The value of B' can be calculated from the following equation:

Formula 9:

$$\frac{B_i}{T_i} \cdot N + S_{mbz} + (N-1) \cdot S_{miz} + N \cdot (n-1) \cdot S_{tt} < \frac{B'}{B_t}$$

The significance of the minimum read block size for continuity, B', can be illustrated by the following relationships:

$$T_1 > T_2 > \ldots > T_M$$

$$B_1 > B_2 > \ldots > B_m > B' > B_{m'+1} > \ldots > B_M$$

In the present invention, the amount of buffered data is accumulated from the outermost zone inward. The buffered data, which should equal $$\sum_{i=1}^{m'} (B_i - B'),$$

will begin to be consumed when the magnetic head is moved inward of B' (m' is the logical zone just outside the logical zone with the minimum read block for continuity). In a preferred embodiment of the present invention, data placement is ganged according to the SCAN methodology (from center inward, then outward, then inward again until the magnetic head reaches the center zone again, as shown in FIG. 3. In this preferred embodiment, because the magnetic head reads from each logical zone twice, the total buffer area should be:

Formula 10:

$$2 \cdot \sum_{i=1}^{m'} (B_i - B') + B'$$

In the present invention, the amount of buffer is provided which is the integer multiple of the value calculated according to Formula 10. This arrangement avoids an undesirable situation which may occur due to a conflict between two pointers pointing to the same buffer unit.

BRIEF DESCRIPTION OF THE DRAWINGS

The present invention will be described in detail with reference to the drawing showing the preferred embodiment of the present invention, wherein.

DETAILED DESCRIPTION OF THE PREFERRED EMBODIMENT

The present invention discloses an improved data placement method for use with a physically zoned disk to utilize the bandwidth difference between outer and inner tracks so as to, among other things, increase the number of users that can be served during a service cycle. A physically zoned disk means a disk that contains tracks with varying densities of sectors/track, which decrease from outer tracks inward. The present invention first divides the disk surface into several logical zones, each logical zone comprises the same number of continuous tracks. A logical zone can encompass tracks that belong to different physical zones, i.e., the same logical zone can contain tracks with different original sectors/track density. After a logical zone is defined, all the tracks in the same logical zone are set to contain the same number of sectors, i.e., all the tracks within a logical zone are set to contain the same number of sectors as that track that originally contains the minimum sectors/track density. While this step may decrease some of the real estate originally belonging to the sectors that are excluded in the logically zoned disk, this is more than compensated for by other benefits such as improved data placement efficiency and increased number of users/clients that can be served in a service round.

Figure 2:
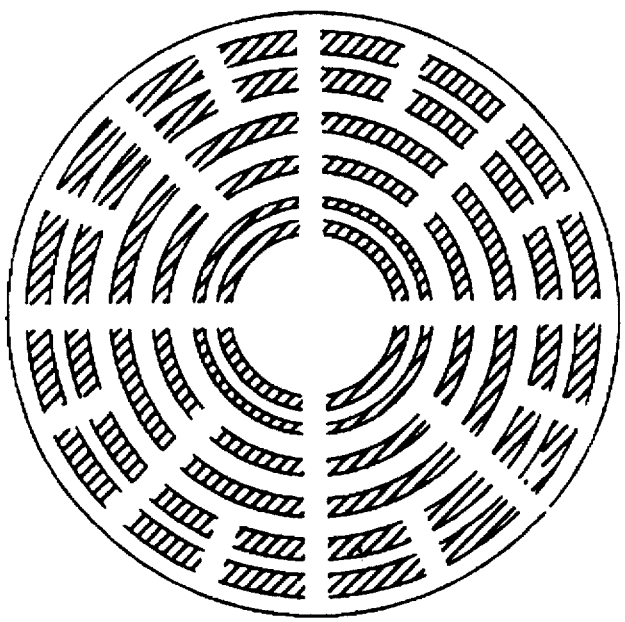
FIG. 2 is a schematic top view of a physically zoned hard disk in which the tracks are allowed to have different number of sectors.
Figure 1:
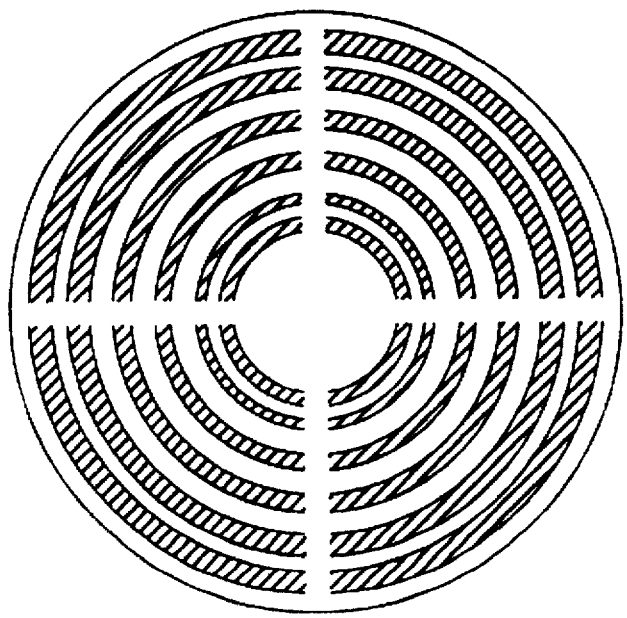
FIG. 1 is a schematic top view of an unzoned hard disk in which all the tracks have the same number of sectors.
Figure 6:
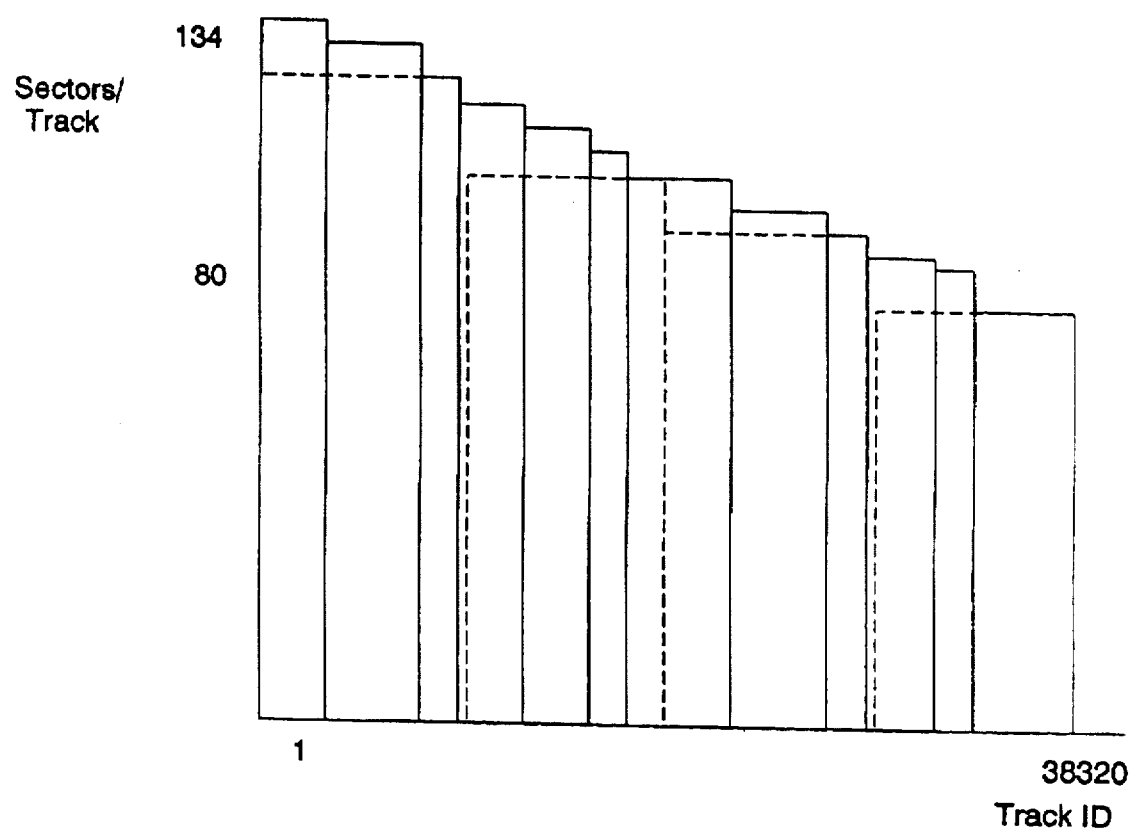
FIG. 6 is a schematic illustration of the relationship between logical zones and physical zones; a logical zone can encompass several physical zones but the sector/track density in each logical zone is set to be equal to the lowest sector/density in the same logical zone.

Now referring to the drawings, FIG. 1 is a schematic top view of an unzoned hard disk in which all the tracks have the same number of sectors. FIG. 2 is a schematic top view of a zoned hard disk in which the tracks are allowed to have different number of sectors. In FIG. 2, it is shown that the sector/track density decreases from outer physical zones to inner physical zones. The present invention takes the disk bandwidth associated with the different data transfer rates resulting from a zoned disk as shown in FIG. 2. FIG. 6 is a schematic illustration of the relationship between logical zones and physical zones. As shown in FIG. 6, a logical zone can, and typically does, encompass several physical zones; however, during implementation, the sector/track densities in each logical zone are set to be equal to the lowest sector/density of the same logical zone. FIG. 6 also shows that all the logical zones contain the same number of tracks.

The next step is to calculate the read block size for each of the logical zones. This is obtained using the following two formulas:

Calculating read block size for each logical zone:

$$B_i = \bar{B} \cdot \frac{T_i}{\sum_{i=1}^{M} T_i}$$

and $$\bar{B} > \frac{M \cdot B_t \cdot \sum_{i=1}^{M} T_i \cdot (N \cdot (n-1) \cdot S_{tt} + S_{mbz} - S_{miz})}{\sum_{i=1}^{M} T_i - N \cdot B_t}$$

wherein $$\bar{B} \left( = \sum_{i=1}^{M} B_i \right)$$

is the total amount of data to be read during the M service rounds from the outermost zone to the innermost zone.

Figure 4:
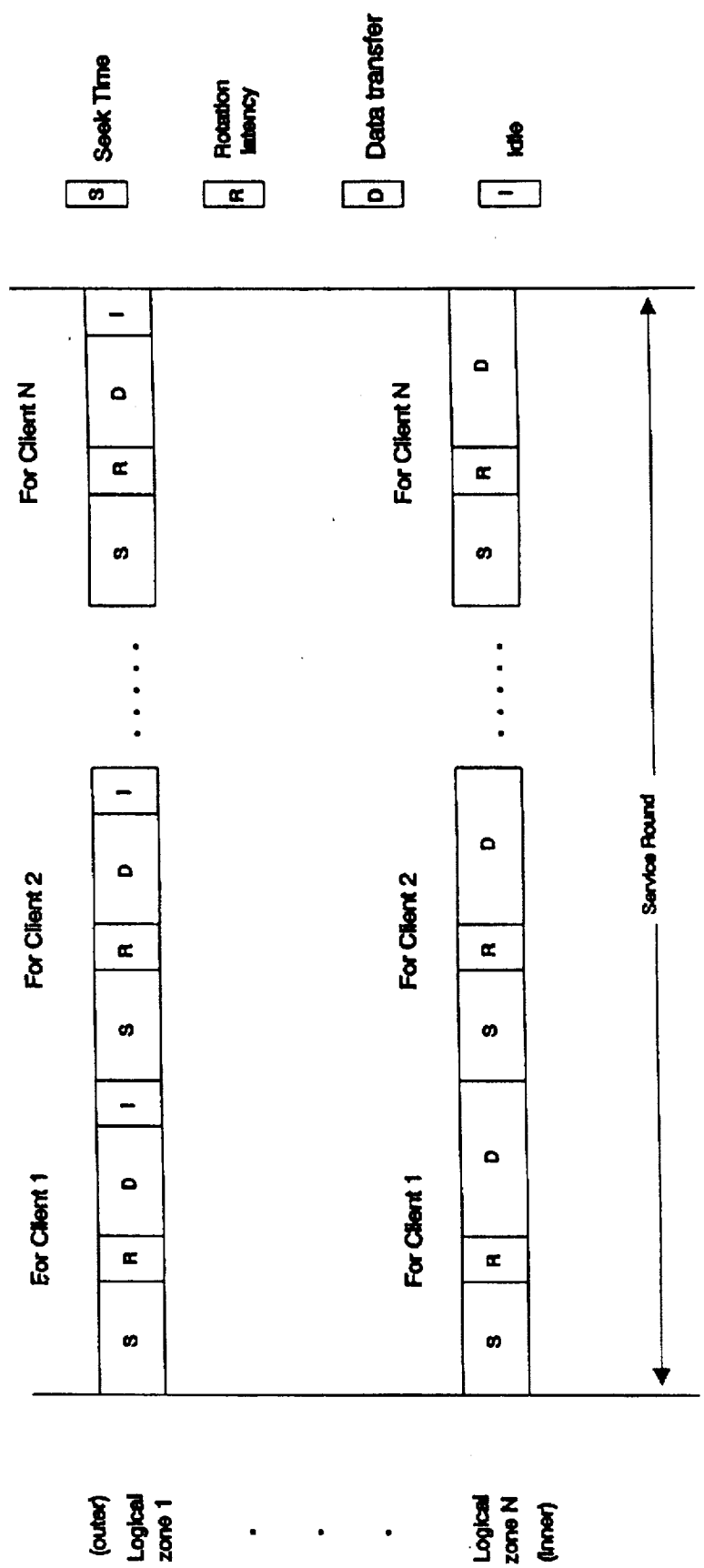
FIG. 4 is a schematic representation of the process of serving a plurality of clients using logical zones but without considering the difference in data transfer rates in different logical zones.
Figure 5:
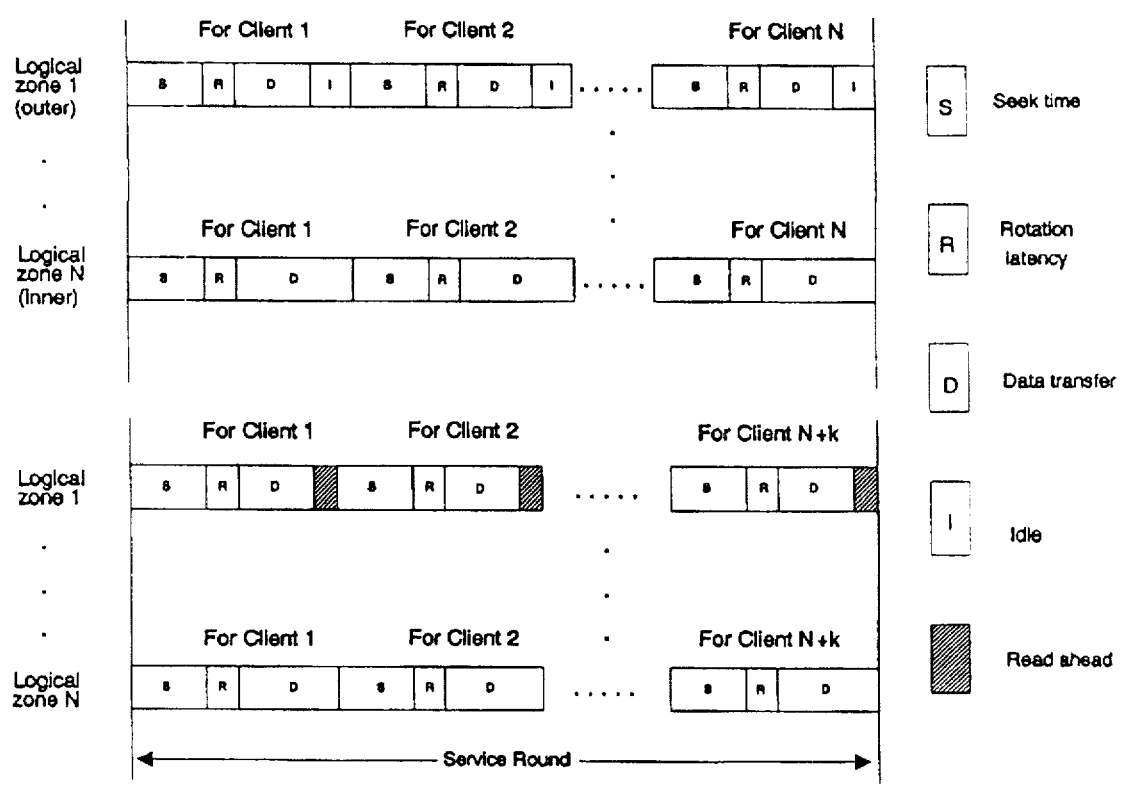
FIG. 5 is a schematic representation of the process of serving a plurality of clients using logical zones which also takes into consideration the difference in data transfer rates in different logical zones so as to increase the number of clients that can be served during a service round.

FIG. 4 is a schematic representation of the process of serving a plurality of clients using logical zones but without considering the difference in data transfer rates in different logical zones. FIG. 5 is a schematic representation of the process of serving a plurality of clients using logical zones which also takes into consideration the difference in data transfer rates in different logical zones so as to increase the number of clients that can be served during a service round. In FIG. 5, it is shown that an addition k clients can be served during the same service round by taking advantage of the disk bandwidth.

In the present invention, the same amount of service time is assigned to all the logical zones. Because the transfer rates differ from logical zone to logical zone, extra amounts of data are read from outer logical zones and stored in a buffer zone so as to compensate for the inadequacy of data read from inner logical zones. In one embodiment of the present invention, the size of the buffer zone is calculated according to the following equation:

Calculating buffer zone size (without SCAN methodology):

$$\text{Buffer zone size} = \sum_{i=1}^{m'} (B_i - B')$$

wherein B' is the minimum read block size which can satisfy media continuity and m' is the logical zone just outside the logical zone with the minimum read block for continuity. The value of B' is calculated from the following equation:

$$\frac{B_i}{T_i} \cdot N + S_{mbz} + (N-1) \cdot S_{miz} + N \cdot (n-1) \cdot S_{tt} < \frac{B'}{B_t}$$

In the present invention, the amount of buffered data is accumulated from the outermost zone inward. The buffered data, which should equal $$\sum_{i=1}^{m'} (B_i - B'),$$

will begin to be consumed when the magnetic moved inward of B'.

Figure 3:
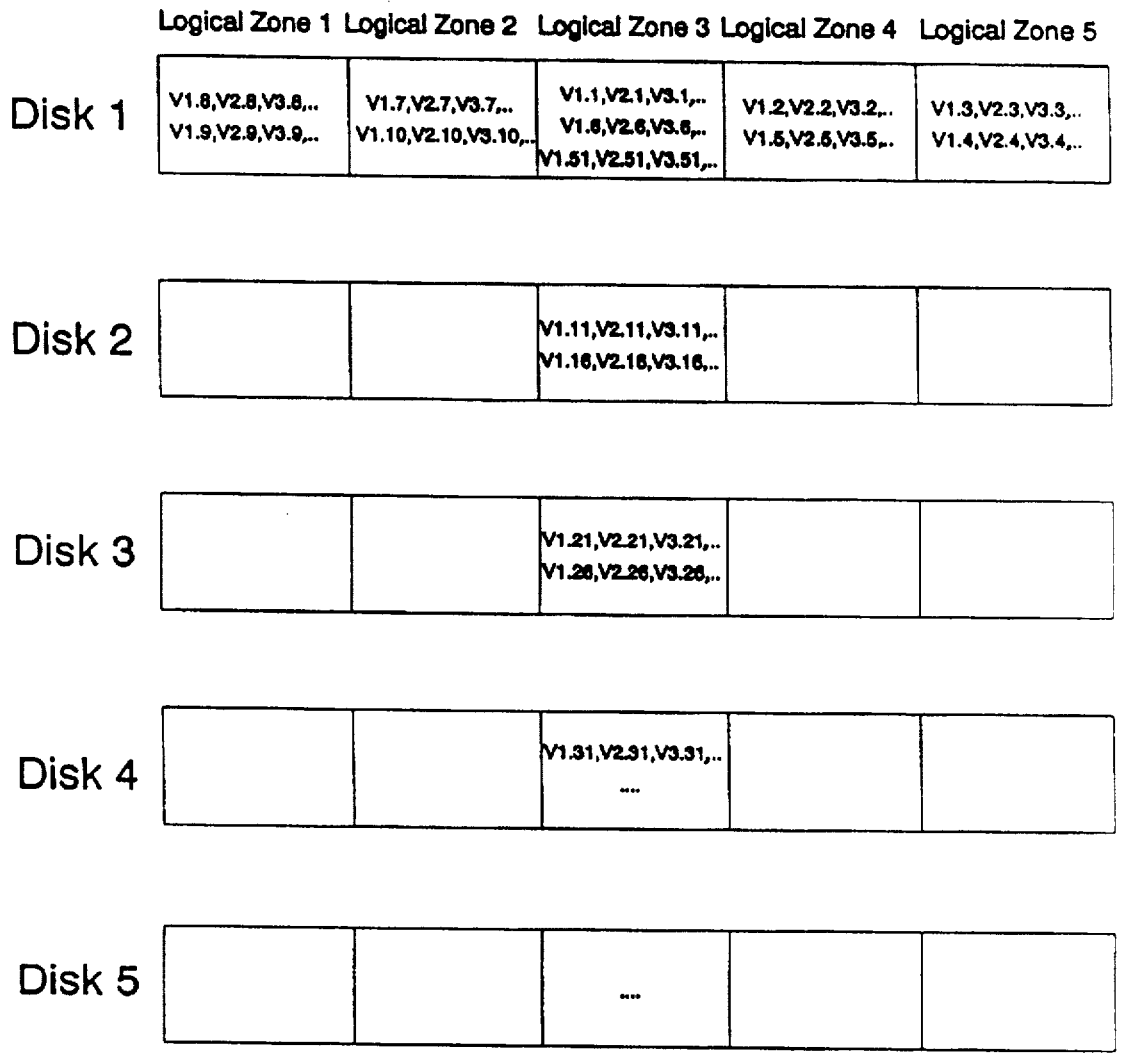
FIG. 3 is a schematic representation of a preferred embodiment of the present invention for placing continuous media on the logical zones of a plurality of disks according to a SCAN methodology.

In a preferred embodiment of the present invention, data placement is arranged according to the SCAN methodology (from center inward, then outward, then inward again until the magnetic head reaches the center zone again, as shown in FIG. 3). FIG. 3 is a schematic representation of a preferred embodiment of the present invention for placing continuous media on the logical zones of a plurality of disks according to a SCAN methodology. FIG. 3 shows that data (v1.1) is first stored in the middle logical zone (logical zone 3) with a predetermined read block size. The second block data (v1.2) is stored in the next inner logical zone (logical zone 4), and the third block data (v1.3) is stored in the innermost logical zone (logical zone 5). Then the direction of data placement is moving from the inner zone outward (v1.4, v1.5, v1.6, v1.7 and v1.8). Finally the direction of the data placement moves inwardly from the outermost logical zone (v1.9, v1.10). Data placement is then moved to Disk 2 just before the data placement reaches the middle logical zone (this is where data placement began).

Figure 7:
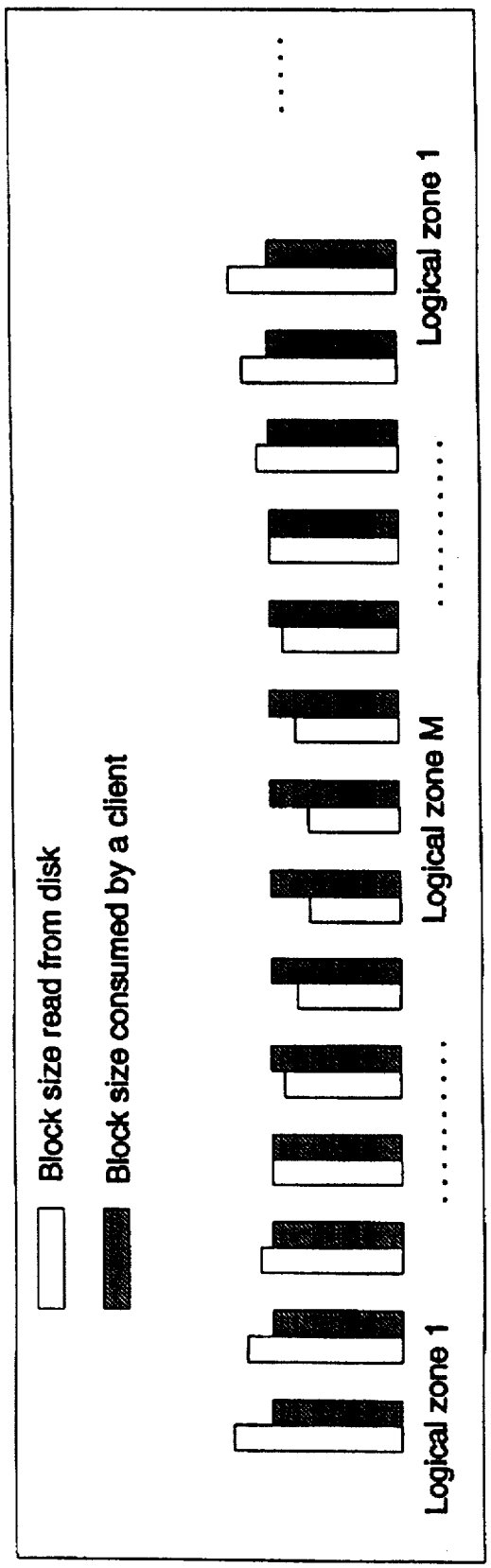
FIG. 7 is a schematic drawing illustrating the block size read from disk and the block size consumed by a client for different logical zones of a disk; the block size consumed by a client is constant for all the logical zones.

FIG. 7 is a schematic drawing illustrating the block size read from disk and the block size consumed by a client for each of the logical zones of a disk. The data transfer rates and read block sizes for all the logical zones are described by the following two formulas:

$$T_1 > T_2 > \ldots > T_M$$

$$B_1 > B_2 > \ldots > B_{m'} > B' > B_{m'+1} > \ldots > B_M$$

wherein B' is the minimum read block size for continuity, and m' is the logical zone just outside of the logical zone with the minimum read block for continuity. In the method disclosed in the present invention, a uniform service time is assigned for each logical zone. The block size consumed by a client is constant for all the logical zones. However, because of the different data transfer rates, more data are read from the outer zones than the inner zones. FIG. 7 indicates that each logical zone is travelled by the magnetic head twice during the SCAN-type data placement. The minimum buffer zone is the sum of B' plus the excess data (Bi−B') read from all the outer zones (i=1 to m').

In this preferred embodiment which utilizes SCAN methodology for data placement, because the magnetic head reads from each logical zone twice, the total buffer zone size should be:

Calculating buffer zone Size (preferred embodiment, with SCAN methodology):

$$\text{Buffer zone size (using SCAN)} = 2 \cdot \sum_{i=1}^{m'} (Bi - B') + B'$$

In actual implementations, the amount of buffer in this preferred embodiment is the integer multiple of the value calculated according to formula shown above. This arrangement avoids an undesirable situation which may occur due to a conflict between two pointers pointing to the same buffer unit.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

A physically zoned hard disc Quantum XP32150W was used to evaluate the method disclosed in the present invention. The Quantum XP32150W hard disk has the following parameters as shown in Tables 1 and 2:

TABLE 1

| | |
|---|---|
| Surfaces: | 10 |
| Tracks per Surface | 3832 |
| Bytes per Sector | 512 |
| Average Track to Track Latency (ms) | 1 |
| Rotational Speed (RPM) | 7200 |

TABLE 2

| Zone | Sectors per Track | Track per Zone | Raw Transfer Rate (KB/s) |
|---|---|---|---|
| 0 | 134 | 208 | 8040 |
| 1 | 131 | 264 | 7860 |
| 2 | 128 | 248 | 7680 |
| 3 | 125 | 304 | 7500 |
| 4 | 123 | 176 | 7380 |
| 5 | 120 | 232 | 7200 |
| 6 | 116 | 248 | 6960 |
| 7 | 113 | 232 | 6780 |
| 8 | 107 | 528 | 6420 |
| 9 | 102 | 216 | 6120 |
| 10 | 98 | 240 | 6120 |
| 11 | 93 | 248 | 5580 |
| 12 | 89 | 248 | 5340 |
| 13 | 85 | 184 | 5100 |
| 14 | 80 | 256 | 4800 |

The disk surface was divided into 1 (no division), 2, 4, 8, 16, and 32 logical zones, respectively, each logical zone containing the same number of tracks. The sector/track densities in each logical zone were set to be equal to the lowest value in the same logical zone. The read block sizes were calculated according to formulas discussed above. Data placements were completed using the SCAN methodology as discussed above. Initially, the magnetic head was placed in the middle logical zone, and read service was conducted using the SCAN arrangement, by which when a new Request occurred, the system determined if the magnetic head was in the logical zone in which the requested data resided. If yes, the requesting client would be immediately served. Otherwise, the service request would be delayed until the magnetic head moved to the correct logical zone.

Figure 8:
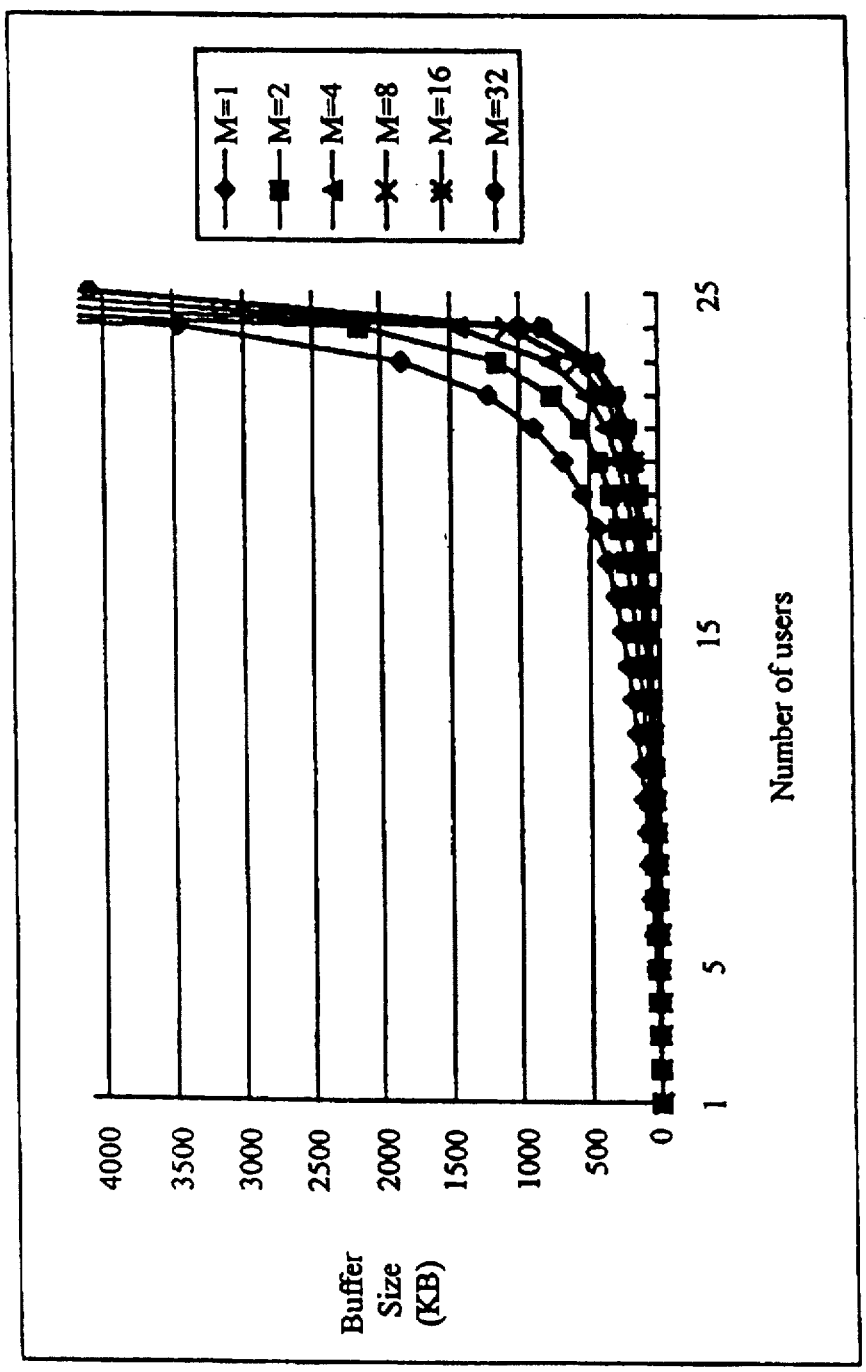
FIG. 8 is a plot of the number of users vs. buffer size calculated for various logical zoning conditions, including one without logical zoning, using uniform read block size.
Figure 9:
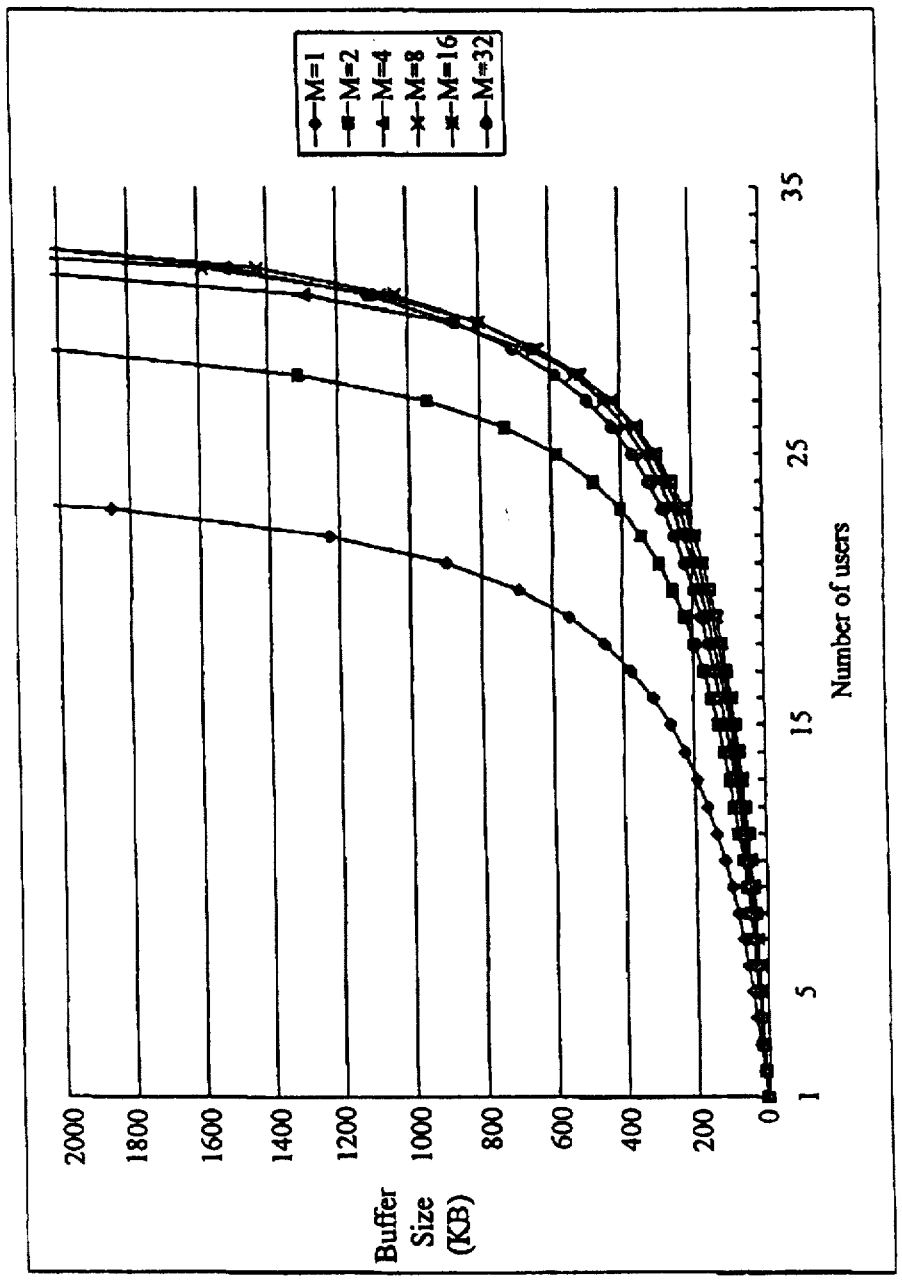
FIG. 9 is a plot of the number of users vs. buffer size calculated for various logical zoning conditions using variable read block size in accordance with a preferred embodiment of the present invention.

FIG. 8 is a plot of the number of users vs. buffer size calculated for various logical zoning conditions, including one without logical zoning, using uniform read block size. And FIG. 9 is a plot of the number of users vs. buffer size calculated for various logical zoning conditions using variable read block size in accordance with the preferred embodiment of the present invention (with SCAN methodology). Comparing FIGS. 8 and 9, it is shown that by taking advantage of the disk bandwidth, the number of users can be substantially increased at the same buffer size. Using a buffer size of 2 MB as an example, the number of users can be increased from 23 to 30, for an incremental gain of seven additional users. FIG. 9 shows that, under the situations of this study, when M>16, no additional benefits were observed with further increased M, indicating that the disk bandwidth has been fully utilized.

Figure 10:
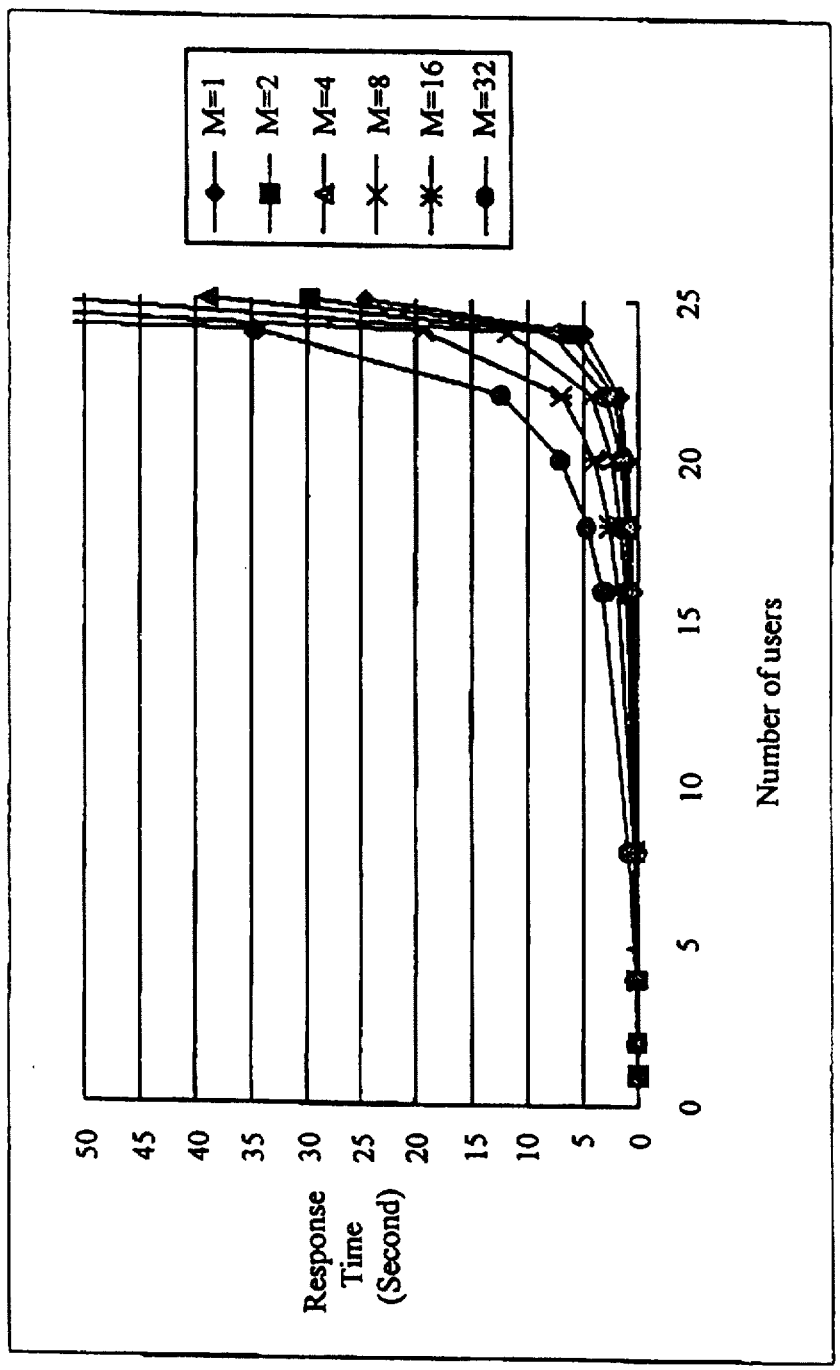
FIG. 10 is a plot of the number of users vs. response time calculated for various logical zoning conditions, including one without logical zoning, using uniform read block size.
Figure 11:
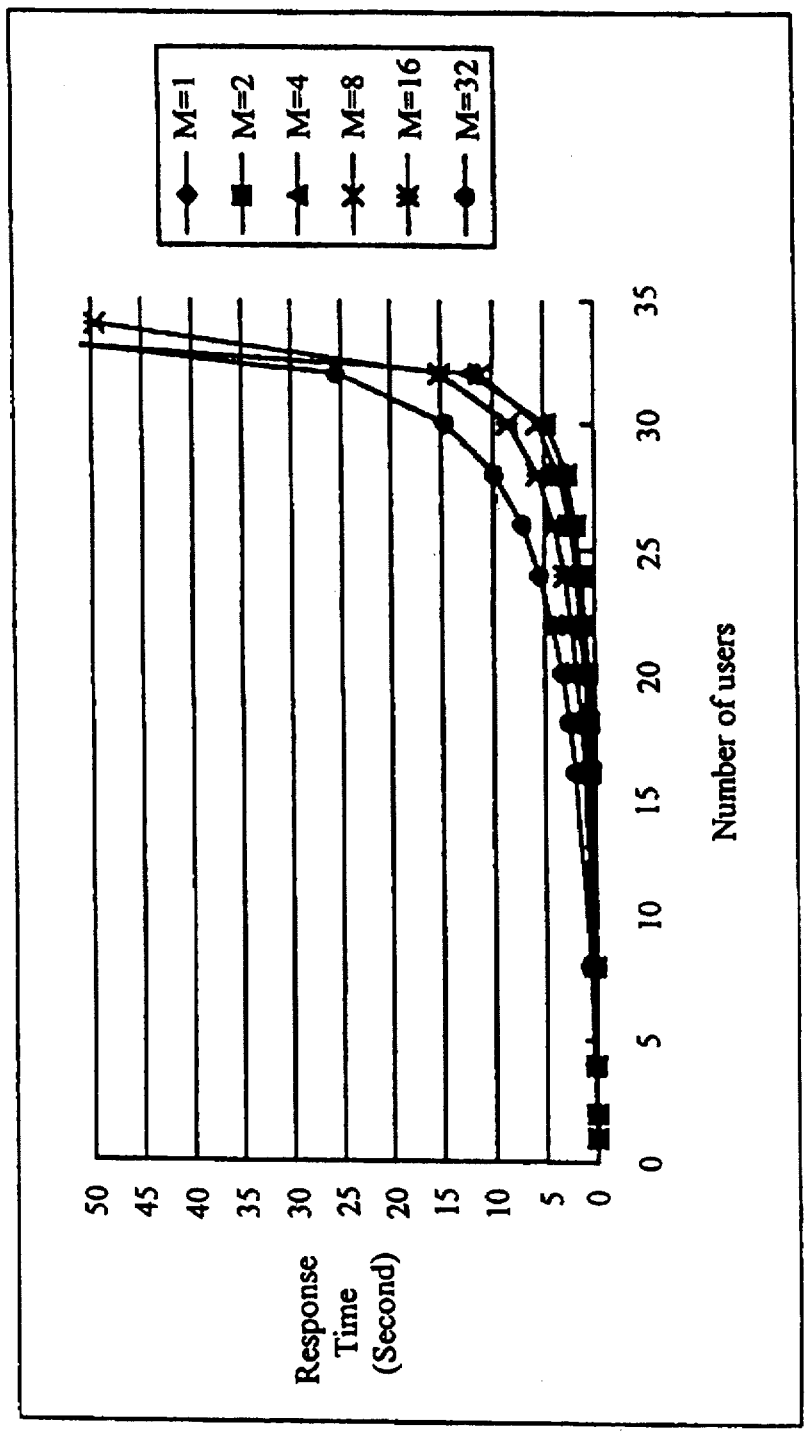
FIG. 11 is a plot of the number of users vs. response time calculated for various logical zoning conditions using variable read block size in accordance with a preferred embodiment of the present invention.

FIG. 10 is a plot of the number of users vs. response time calculated for various logical zoning conditions, including one without logical zoning, using uniform read block size. FIG. 11 is a plot of the number of users vs. response time calculated for various logical zoning conditions using variable read block size in accordance with the preferred embodiment of the present invention (with SCAN methodology). Typically increasing user would increase buffer size; this would also increase response time, However, with the present invention, because the buffer size was reduced, the required response time was also reduced.

The present invention can be most advantageously employed in continuous media servers for video-on-demand or audio-on-demand applications. Using the video-on-demand as an example, an optimum and most cost-effective number of logical zones can be calculated according to the response time, memory buffer requirement, and the number of clients to be served. The size of the logical zones and the data transfer rate in each logical zone can be subsequently calculated, as shown in the present invention, in accordance with the methodology of data arrangement so choosen, so as to ensure the continuity of the read data. Thereafter, data can be partitioned and stored in the logical zones. In the present invention, each logical zone is a combination of continuous (or contiguous) tracks. The sectors/track density is set to be the same within each logical zone, and the data transfer rate in each logical zone is the data transfer rate according to the (original) slowest data transfer rate of all the tracks contained in that logical zone. In a preferred embodiment, after the system is started, the service time to be allowed for each user is determined using an admission control strategy, so as to ensure that the required data during each data read will fall on the same logical zone. Thereafter, data are read according to the read data size of each logical zone. The memory buffer size and number of clients that can be served can be calculated using the formulas described in the present invention. In the present invention, each logical zone can be assigned with a read index and an exhaustion index, consistent with the buffer size.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for placing continuous media data in a memory storage disk, wherein said memory storage disk contains a plurality of tracks each track having at least one sector and said disk is divided into a plurality of physical zones of different sector/track density, said method comprising the steps of:
   (a) dividing said disk into a plurality of logical zones of equal number of tracks, each logical zone being allowed to include tracks of different sector/track density;
   (b) for each logical zone, setting the tracks contained therein to have the same number of sector/density as the track with the smallest sector/track density;
   (c) assigning a constant disk access time for each logical zone; and
   (d) determining a read block size for each logical zone in such a manner that:
      (i) the read block size decreases from outer logical zones to inner logical zones;
      (ii) assigning a first portion of said logical zones with read block sizes that are greater than a minimum read block size required for continuous media playing so as to read extra data, which will be stored in a buffer;
      (iii) assigning a second portion of said logical zones with read block sizes that are smaller than said minimum read block size to thereby cause an inadequacy; and
      (iv) said block sizes are structured such that said inadequacy from said second portion of logical zones will be compensated by said extra data stored in said buffer, so as to ensure a continuous media play requirement.

2. The method for placing continuous media data in a memory storage disk according to claim 1, wherein said read block size for each logical zone is determined according to the following formulas:

$$B_i = \bar{B} \cdot \frac{T_i}{\sum_{i=1}^{M} T_i}$$

and $$\bar{B} > \frac{M \cdot B_t \cdot \sum_{i=1}^{M} T_i \cdot (N \cdot (n-1) \cdot S_{tt} + S_{mbx} - S_{mix})}{\sum_{i=1}^{M} T_i - N \cdot B_t}$$

where $B_i$ is the data block size in logical zone i, $T_i$ is lowest data transfer rate in logical zone i, and M is the number of logical zones; $S_{mbz}$ is the maximum seeking time required by the magnetic head between two neighboring logical zones; $S_{miz}$ is the maximum seeking time required by the magnetic head within a logical zone; $S_{tt}$ is the average seeking time between tracks (including the rotational latency required for changing head, and seeking time); $B_t$ is the (constant) bit rate of the continuous media; n is the number of tracks contained in a logical zone;

$$\bar{B} \left( = \sum_{i=1}^{M} Bi \right)$$

is the total amount of data to be read during the M service rounds from the outermost zone to the innermost zone; and N is the maximum number of users to be served.

3. The method for placing continuous media data in a memory storage disk according to claim 2, wherein said buffer size is greater than or equal to a value calculated from the following formula:

$$\text{Buffer zone size} = \sum_{i=1}^{m'} (B_i - B')$$

wherein B' is the minimum read block size which can satisfy media continuity and m' is the logical zone just outside the logical zone with the minimum read block for continuity.

4. The method for placing continuous media data in a memory storage disk according to claim 3, wherein said minimum read block size B' is calculated from the following formula:

$$\frac{B_i}{T_i} \cdot N + S_{mbz} + (N-1) \cdot S_{miz} + N \cdot (n-1) \cdot S_{tt} < \frac{B'}{B_t}.$$

5. The method for placing continuous media data in a memory storage disk according to claim 2, wherein said continuous media data are placed in said disk according to a SCAN methodology.

6. The method for placing continuous media data in a memory storage disk according to claim 5, wherein said buffer size is greater than or equal to a value calculated from the following formula:

$$\text{Buffer zone size (using SCAN)} = 2 \cdot \sum_{i=1}^{m'} (Bi - B') + B'$$

wherein B' is the minimum read block size which can satisfy media continuity and m' is the logical zone just outside the logical zone with the minimum read block for continuity.

7. The method for placing continuous media data in a memory storage disk according to claim 6, wherein said minimum read block size B' is calculated from the following formula:

$$\frac{B_i}{T_i} \cdot N + S_{mbz} + (N-1) \cdot S_{miz} + N \cdot (n-1) \cdot S_{tt} < \frac{B'}{B_t}.$$

8. The method for placing continuous media data in a memory storage disk according to claim 1, wherein each of said read blocks contains a plurality of said tracks.

9. A computer disk for storing continuous media data comprising a plurality of data tracks divided into a plurality of physical zones of different sector/track density; wherein (a) said disk is into a plurality of logical zones of equal number of tracks, wherein said logical zones are structured to contain at least a first portion and a second portion and each logical zone is allowed to include tracks of different sector/track density;

(b) each logical zone is reformatted such that the tracks contained therein all have the same number of sector/density as the track with the smallest sector/track density;

(c) each logical zone is assigned a constant disk access time for each logical zone; and (d) each logical zone is also assigned a unique read block size such that:
   (i) the read block size decreases from outer logical zones to inner logical zones;
   (ii) said first portion of said logical zones are assigned with read block sizes that are greater than a minimum read block size required for continuous media playing so as to read extra data, which will be stored in a buffer;
   (iii) said second portion of said logical zones are assigned with read block sizes that are smaller than said minimum read block size to thereby cause an inadequacy; and
   (iv) said read block sizes are structured such that said inadequacy from said second portion of logical zones will be compensated by said extra data stored in said buffer, so as to ensure a continuous media play requirement.

10. The computer disk for storing continuous media data according to claim 9, wherein said read block size for each logical zone is determined according to the following formulas:

$$B_i = B \cdot \frac{T_i}{\sum_{i=1}^{M} T_i}$$

and

-continued $$B > \frac{M \cdot B_t \cdot \sum_{i=1}^{M} T_i \cdot (N \cdot (n-1) \cdot S_{tt} + S_{mbz} - S_{miz})}{\sum_{i=1}^{M} T_i - N \cdot \cdot B_t}$$

where $B_i$ is the data block size in logical zone i, T is lowest data transfer rate in logical zone i, and M is the number of logical zones; $S_{mbz}$ is the maximum seeking time required by the magnetic head between two neighboring logical zones; $S_{miz}$ is the maximum seeking time required by the magnetic head within a logical zone; $S_{tt}$ is the average seeking time between tracks (including the rotational latency required for changing head, and seeking time); $B_t$ is the (constant) bit rate of the continuous media; n is the number of tracks contained in a logical zone;

$$\overline{B} \left( = \sum_{i=1}^{M} Bi \right)$$

is the total amount of data to be read during the M service rounds from the outermost zone to the innermost zone; and N is the maximum number of users to be served.

11. The computer disk for storing continuous media data according to claim 10, wherein said buffer size is greater than or equal to a value calculated from the following formula:

$$\text{Buffer zone size} = \sum_{i=1}^{m'} (B_i - B')$$

wherein B' is the minimum read block size which can satisfy media continuity and m' is the logical zone just outside the logical zone with the minimum read block for continuity.

12. The computer disk for storing continuous media data according to claim 11, wherein said minimum read block size B' is calculated from the following formula:

$$\frac{B_i}{T_i} \cdot N + S_{mbz} + (N-1) \cdot S_{miz} + N \cdot (n-1) \cdot S_{tt} < \frac{B'}{B_t}.$$

13. The computer disk for storing continuous media data according to claim 10, wherein said continuous media data are placed in said disk according to a SCAN methodology.

14. The computer disk for storing continuous media data according to claim 13, wherein said buffer size is greater than or equal to a value calculated from the following formula:

$$\text{Buffer zone size (using SCAN)} = 2 \cdot \sum_{i=1}^{m'} (Bi - B') + B'$$

wherein B' is the minimum read block size which can satisfy media continuity and m' is the logical zone just outside the logical zone with the minimum read block for continuity.

15. The computer disk for storing continuous media data according to claim 14, wherein said minimum read block size B' is calculated from the following formula:

$$\frac{B_i}{T_i} \cdot N + S_{mbz} + (N-1) \cdot S_{miz} + N \cdot (n-1) \cdot S_{tt} < \frac{B'}{B_t}.$$

16. The computer disk for storing continuous media data according to claim 9, wherein each of said read blocks contains a plurality of said tracks.

* * * * *